United States Patent
Lillig

(10) Patent No.: US 6,178,603 B1
(45) Date of Patent: Jan. 30, 2001

(54) WIRE TENSIONING APPARATUS

(76) Inventor: James A. Lillig, 22310 Y Hwy., Peculiar, MO (US) 64078

(*) Notice: Under 35 U.S.C. 154(b), the term of this patent shall be extended for 0 days.

(21) Appl. No.: 09/411,439

(22) Filed: Oct. 1, 1999

(51) Int. Cl.[7] .................................................. B25B 25/00
(52) U.S. Cl. ................. 24/132 R; 24/134 R; 24/68 CD; 254/222
(58) Field of Search .............................. 24/71.1, 68 CD, 24/122.6, 134 L, 132 R, 134 R, 134 KB, 115 R; 242/389, 393, 395; 254/217, 222

(56) References Cited

U.S. PATENT DOCUMENTS

| | | |
|---|---|---|
| 301,940 | 7/1884 | Wall . |
| 403,620 | 5/1889 | Stiles . |
| 765,190 | 7/1904 | Moyers . |
| 902,763 | 11/1908 | Roberts . |
| 1,267,540 * | 5/1918 | Green ................... 254/222 |
| 1,751,381 | 3/1930 | Anderson . |
| 1,868,558 | 7/1932 | Anderson . |
| 2,451,389 * | 10/1948 | Howe ..................... 254/222 |
| 3,020,021 | 2/1962 | Story . |
| 3,108,785 | 10/1963 | Slinden . |
| 3,337,927 * | 8/1967 | Dresie ................... 24/132 R |
| 4,541,149 * | 9/1985 | Jensen .................. 24/134 R |
| 4,716,630 * | 1/1988 | Skyba ................... 24/134 R |
| 4,878,270 * | 11/1989 | Westerkamp ......... 24/134 R X |
| 5,282,296 | 2/1994 | Huang . |

* cited by examiner

*Primary Examiner*—Robert J. Sandy
(74) *Attorney, Agent, or Firm*—Shughart, Thomson & Kilroy, P.C.

(57) ABSTRACT

A wire tensioning apparatus includes a pair of opposed pressure grips interconnected by a cable or cord, and a wire tensioning device such as a double-action winch secured to the cord intermediate the grips. The grips each include a baseplate having a rotatable jaw or eccentric cleat with a plurality of teeth formed in a lower edge thereof for attaching the grips to a fence wire. In operation, the winch is selectively rotated to pull the grips inward toward one another providing tension to the fence wire. The apparatus can be left attached to the fence wire to provide permanent support, and can be intermittently tightened to provide additional tension.

8 Claims, 2 Drawing Sheets

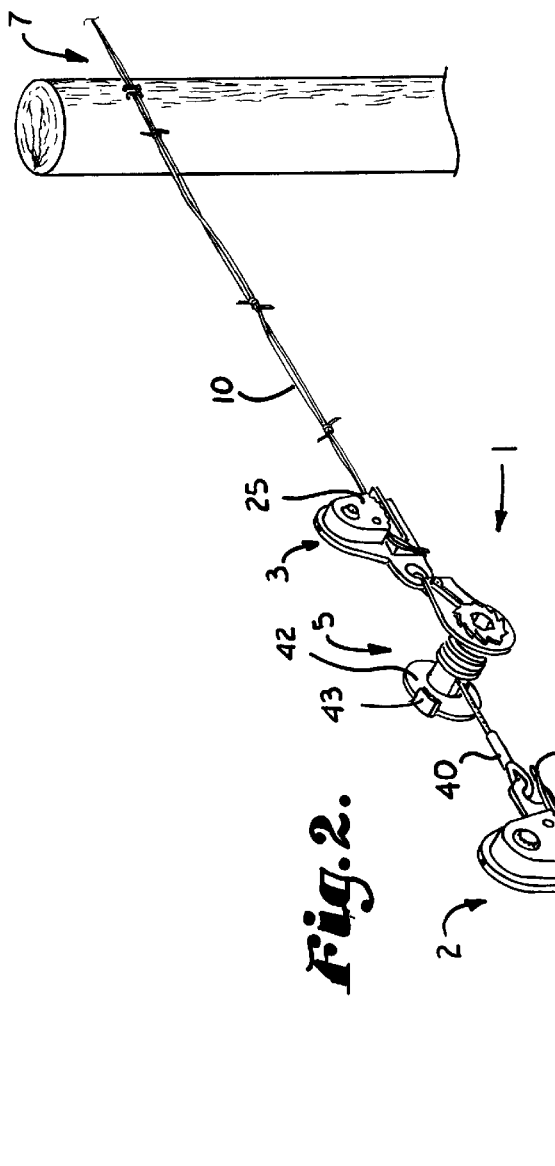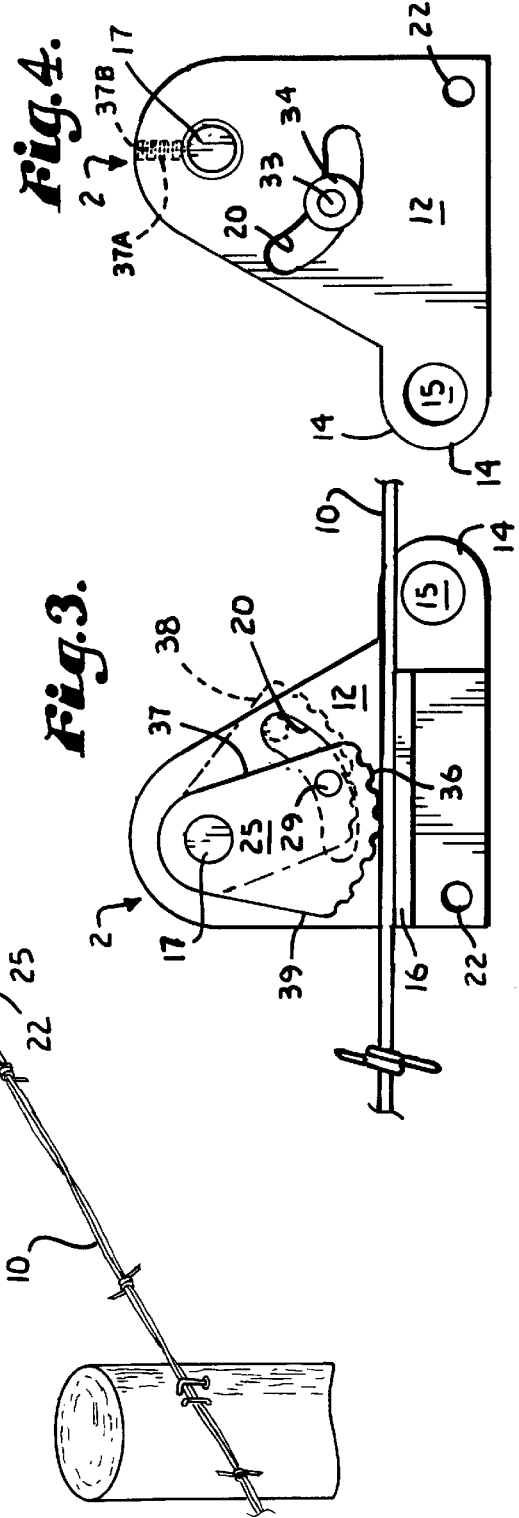

US 6,178,603 B1

WIRE TENSIONING APPARATUS

BACKGROUND OF THE INVENTION

1. Field of the Invention

This invention is directed to a tensioning apparatus for tightening fence wire and the like. The apparatus can easily be attached to a length of fence wire via opposed gripping devices which are interconnected by a cord, and also includes an intermediate tensioning device for pulling opposed ends of the cord inward to provide tension to the fence wire.

2. Description of the Related Art

Prior art wire tensioning apparatuses include various forms of stretchers and splicers adapted to be attached to an end of a wire or other device for pulling. For example, U.S. Pat. No. 1,751,381 discloses a wire stretcher having a pair of gripping members each having a respective eye for receiving a respective free end of wire. The gripping members are interconnected by a chain wheel for turning a chain. The chain wheel is turned to move the opposed wire ends toward one other.

U.S. Pat. No. 1,868,558 discloses a tension device for stretching a wire wherein a chain with a gripping device at one end is attached to a wire for pulling. The wire is pulled by passing links of the chain around a rotatable element and then downward. The rotatable element includes a ratchet device used in passing the chain links to pull the wire.

Other attempts have been made to produce tensioning devices and wire stretchers. However, a need still exists for a wire tensioning apparatus which is self-supporting, can be easily attached at opposite ends thereof to a length or lengths of wire, and which acts simultaneously on opposed portions of the wire to provide tension.

SUMMARY OF THE INVENTION

The present invention comprises a wire tensioning apparatus for use with wire such as a conventional or barbed-wire fence. The apparatus includes a pair of pressure grips interconnected by a cord, and an intermediate double-action tensioning device which cooperates with the cord to pull the grips inward and provide tension to the fence wire.

The grips each include an eccentric cleat pivotally attached to a baseplate. The cleat on each base plate is pivotal into and out of closely spaced relation with a shelf or another cleat to from a pinch point. A plurality of teeth are formed along a lower edge of each cleat. Each grip is secured to a wire by positioning the wire between the cleat and the shelf and pulling the wire therebetween causing the cleat to pivot into engaging relationship with the wire. The grips are joined together by connecting opposite ends of the cord to the grips. The tensioning device is generally a ratcheted winch selectively acting on the cord to pull the grips inward toward one another to provide tension to the fence wire.

OBJECTS AND ADVANTAGES OF THE INVENTION

The principal objects and advantages of the present invention include: providing an improved wire tensioning apparatus for fence wire or the like; providing such an apparatus which can be readily attached to a length or lengths of wire and operated to tension the wire or wires; providing such an apparatus which can be selectively attached to two free ends of wire, or, alternatively to a single continuous length of wire; providing such an apparatus which is self-supporting; providing such an apparatus which is portable; providing such an apparatus which is readily attachable and detachable; providing such an apparatus which can be attached to the wire to provide permanent tension and support; providing such an apparatus which can be intermittently adjusted to increase or decrease wire tension; providing such an apparatus which is weatherproof; and providing such an apparatus which is particularly well-suited to its intended purpose; and providing a method for repairing wire fences which is quick, relatively easy, inexpensive, durable and reliable.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a perspective view of the apparatus at a reduced scale with the fence wire shown in a fully tensioned position.

FIG. 3 is an enlarged front elevational view of a pressure grip of the apparatus showing a cleat thereof in an engaged position with the fence wire showing the cleat in an open position in phantom lines.

FIG. 4 is an enlarged rear elevational view of the pressure grip of the present invention.

DETAILED DESCRIPTION OF THE INVENTION

I. Introduction and Environment

Figure 1:
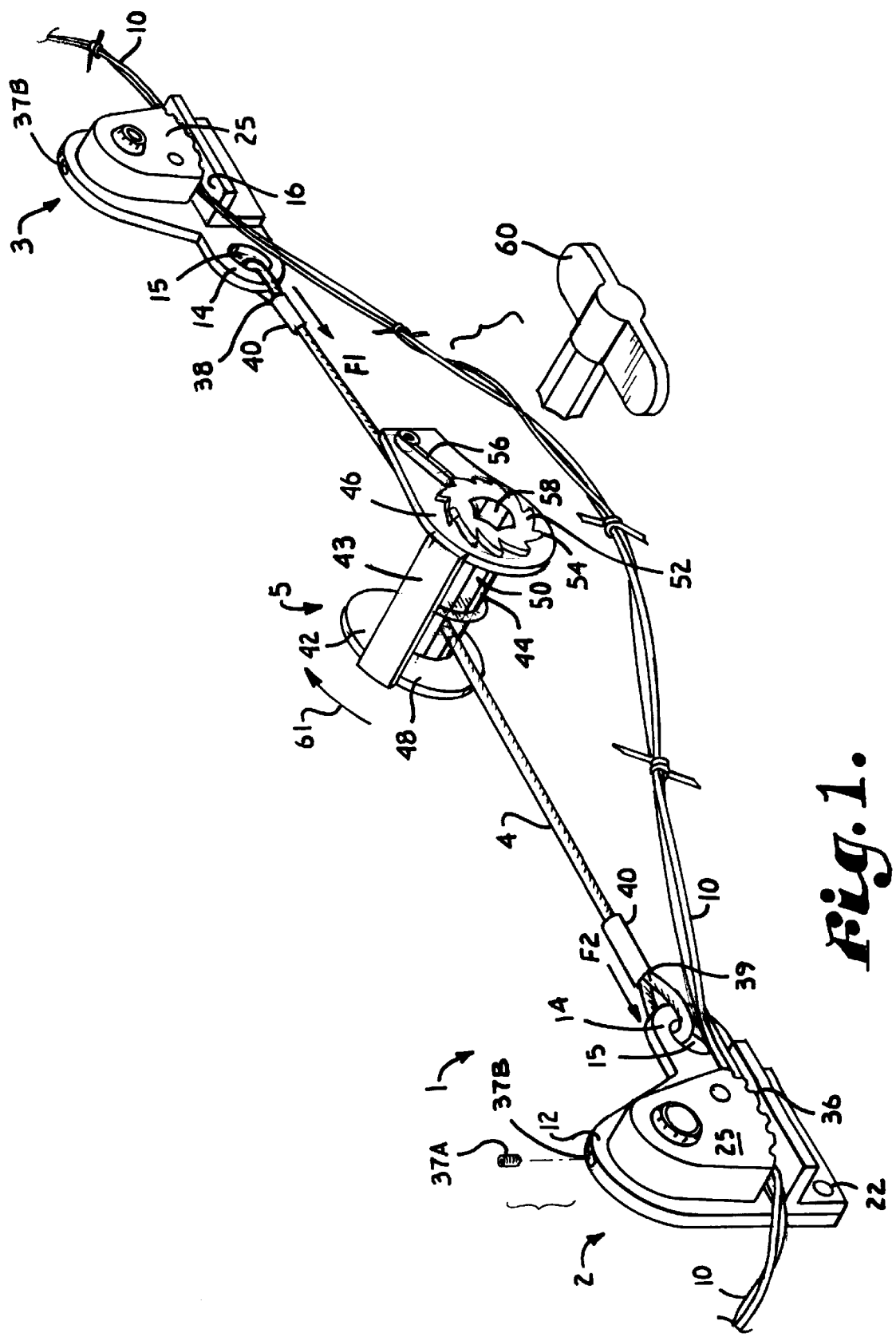
FIG. 1 is a perspective view of a wire tensioning apparatus embodying the present invention and shows the apparatus attached to a slackened length of fence wire.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawing, the reference numeral 1 refers a wire fence tensioning apparatus which embodies the present invention. The apparatus 1 generally comprises a pair of wire pressure grip devices or grips 2 and 3 interconnected by a cord or cable 4, and a tensioning device 5 connected to the cord 4 intermediate the grips 2 and 3. For purposes of this application and with reference to FIGS. 1 and 2, the front of each grip 2 and 3 is generally considered the side furthest away from the tensioning device 5 and the rear of each grip 2 and 3 is generally considered the side closest to the tensioning device 5.

II. Pressure Grips

The illustrated grips 2 and 3 are mirror images of one another. The grips 2 and 3 are preferably formed of a durable material which is resistant to corrosion, such as a stainless steel. Referring to FIG. 1, the apparatus 1 is adapted to be readily attachable to a fence 7 by securing it to one or more lengths of fence wire 10 via the grips 2 and 3. Each grip includes a respective baseplate 12 with a curved upper edge and a flat lower edge. An eyelet or flange 14 with an opening 15 therein extends horizontally proximate a lower portion of each base plate 12.

A shelf 16 projects from the baseplate 12 proximate a lower end thereof. A pivot pin 17 is pivotally secured to and extends outward from each baseplate 12 in spaced relation above a respective shelf 16. An arcuate guide slot 20 extends through a central portion of each baseplate 12 between the pivot point 17 and the shelf 16. The arcuate guide slot 20 is radially spaced from the pivot pin 17. A circular opening or bore 22, the purpose of which will be discussed later, extends through a lower portion of each base plate 12.

An eccentric cleat or jaw 25 is attached at an upper end thereof to the pivot pin 17 of each respective baseplates 12 such that the cleat 25 pivots relative to the base plate and about a pivot point or axis extending through the pivot pin 17. A cylindrical guide pin 33 is secured to each cleat 25 at a lower end thereof, and extends through the associated guide slot 20. An annular rim or washer 34 is secured to the guide pin 33 on a side of the base plate 12 opposite the cleat 25. The pin 33 limits the rotation of the cleat 25 in either direction about the respective pivot axis by engaging opposite ends of each guide slot 20. A plurality of teeth 35 are formed along the lower edge of each cleat 25.

Referring to FIG. 3, the cleat 25 of grip 2 is eccentric in that the length or radius of the cleat 25 gradually increases from a front edge 36 to a rear edge 37 thereof. When the grip is held upright, as generally shown in FIGS. 2 and 3 but without a wire 10 engaged thereby, the center of gravity of the cleat 25 is closer to the rear edge 37 than the front edge 36 such that the front edge 36 of the cleat 25 is pivoted slightly forward and the rear edge 37 extends almost perpendicular to the shelf 16. In the orientation just described, the distance or size of the pinch point between the cleat teeth 35 is generally the smallest it will be and smaller than the thickness of a wire 10 to be secured therebetween. To engage a wire 10 using the grip 2, the cleat 25 is manually pivoted rearward to increase the size of the gap between the cleat 25 and the shelf 16 enough to insert a wire 10 therebetween, as generally shown in phantom lines in FIG. 3. The alignment of the cleat 25 as shown in phantom lines in FIG. 3 may generally be referred to as an open alignment.

After a wire 10 is inserted between the cleat 25 and an upper surface of the shelf 16, the cleat 25 is released such that the cleat 25 pivots forward decreasing the size of the gap between the cleat 25 and the shelf 16 until the cleat 25 abuts the wire 10 as shown in FIG. 3 in solid lines. Pulling the wire 10 forward relative to the front of the grip 2, or vice versa, causes the cleat 25 to pivot further forward, further decreasing the gap between the cleat 25 and shelf 16 to firmly secure the wire 10 therebetween. This alignment, as shown in solid lines in FIG. 3 is generally referred to as an engaged position. An elongate set screw or stop 37A extends through a opening 37B in a top portion of each base plate 12 and can selectively engage each pin 17 to secure the cleat 25 in its engaged position.

To release the wire 10 from the grip 2, the wire 10 is pulled rearward relative to the grip 2, or vice versa, which causes the cleat 25 to pivot rearward increasing the size of the gap between the cleat 25 and the shelf 16 until the wire 10 can be removed from therebetween. The procedure for securing the grip 3 to a wire 10 is the same as described for grip 2.

III. Cord 4 and Tensioning Device 5.

The cord 4 is shown as a stranded steel cable in the drawings but it is foreseen that the cord 4 could be a chain, cable, string, belt, rope or similar device. The cord 4 includes a pair of opposite ends 38 and 39 which are threaded around the eyelet opening 15 and secured by a crimped wire cable clamp 40.

The tensioning device 5 is shown in the drawings as a double-action winch 42 but could also be a ratchet, sprocket, pulley, reel, cam, threaded member or any device capable of pulling opposed ends of a line, belt or similar article toward one another. The winch 42 generally comprises a supportive frame 43 supporting a spool 44. The spool includes opposite journaled ends rotatably mounted between a pair of end caps 46 and 48 such that the spool 44 rotates relative to the caps 46 and 48. An elongate slot 50 sized to receive the cord 4 extends through the spool 44.

A radial sprocket 52 with a plurality of teeth 54 is attached to a front end of the spool 44 such that the sprocket 52 rotates with the spool 44. A spring pawl 56 is pivotally mounted to a front surface of the cap 44 for engaging the teeth 54 to prevent rotation of the spool 44 in one direction. The pawl 56 can be selectively pivoted to disengage the teeth 54 and allow movement of the barrel 44 in either direction. A recessed key hole 58 sized to receive a key 60 is formed through a center portion of the ratchet wheel 52 and extends through the spool 44.

IV. Operation

In operation, the apparatus is attached to a fence 7 by securing the grips 2 and 3 to fence wire 10 at spaced-apart locations. The grips 2 and 3 are secured to the fence wire 10 by positioning a section of the fence wire 10 between the teeth 36 and the shelf 16 of each respective grip as previously described. The grips 2 and 3 are then pulled slightly inward or rearward by applying a force F1 (FIG. 1) which will move the cleats 25 to their engaged position with the teeth 34 pressing downward on the wire 10 to firmly secure the grips 2 and 3 to the fence wire 10. The wire 10 can then be tightened to a desired tension by inserting the key 60 into the key hole 58 and turning to operate the winch 42 in such a manner as to rotate the spool 44 in the direction of arrow 61 relative to the frame 43. The cord 4 will wrap around the spool 44 as the winch 42 is turned and the wire 10 is tensioned.

As shown in FIG. 2, the apparatus 1 can be left attached on the wire 10 to provide a desired amount of tension and can also be intermittently tightened at any time to provide additional tension. If desired, excess of portions of fence wire 10 intermediate the grips may be cut away as at 62. Excess free ends of wire 10 can also be secured to the baseplate 12 by inserting through the opening 22 and securing thereto. The apparatus 1 may also be used to pull ends of different wires 10 together by attaching grips 2 and 3 to opposed ends of the separate wires 10.

Alternatively, the apparatus 1 can be used to tension the fence wire 10 as described and subsequently replaced by another device such as a turnbuckle (not shown).

The apparatus 1 can be removed from the wire 10 by slightly rotating the winch 42 such that the pawl 56 can be pivoted outward and disengaged from the sprocket 52 which allows the winch 42 to rotate in the reverse direction and provide slack to the cord 4. The pressure grips 2 and 3 can be removed after applying a force F2 to the grips such that the cleats 25 pivot inward or rearward sufficient to allow removal of the wire 10 from between the cleats 25 and the shelves 16.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for tensioning a wire, comprising:
   a) first and second grips for gripping said wire;
   b) a cord having first and second ends directly connected to said first and second grips respectively;
   c) a tensioning device connected to said cord intermediate said grips; and
   d) said tensioning device selectively operable to simultaneously pull said grips inward to provide tension to said wire.

2. The apparatus as in claim 1 wherein each said grip comprises a base plate, a shelf connected to said base plate, and an eccentric cleat in spaced relation to said shelf; said cleat pivotally attached to said base plate for selectively engaging said wire when said wire is positioned between said cleat and said shelf.

3. An apparatus for tensioning a wire, comprising:
   a) a first grip and a second grip for gripping said wire;
   b) a single length of cord having first and second ends attached to said first and second grips; and
   c) a winch having a spool rotatably mounted between a pair of end caps; and a slot formed in and extending through said spool for receiving a portion of said single length of cord intermediate said first and second ends such that said first and second ends of said cord pull inward toward said winch as said spool is rotated.

4. The apparatus as in claim 3 wherein each said grip comprises a base plate, a shelf connected to said base plate, and an eccentric cleat pivotally attached to said base plate in spaced relation to said shelf; said cleat for selectively engaging said wire when said wire is positioned between said cleat and said shelf.

5. A grip for gripping a wire, comprising:
   a) a baseplate;
   b) a shelf with an upper surface attached to said baseplate;
   c) an eccentric cleat pivotally attached to said baseplate above said shelf upper surface by a pivot pin and including a cleat lower surface having a plurality of teeth formed thereon, said cleat increasing in length from a front edge toward a rear edge thereof and being pivotable from an open position to an engaging position such that the size of a gap between said shelf upper surface and said cleat lower surface decreases as said cleat pivots from said open position to said engaging position, said teeth of said cleat lower surface for engaging a wire positionable between said cleat and said shelf when said cleat is pivoted to said engaging position; and
   d) an opening in a top portion of said baseplate; said opening receiving a stop for selectively engaging said cleat to secure said cleat in the engaging position.

6. The apparatus as in claim 5 further comprising an opening formed in said base plate for inserting a free end of said wire therethrough to secure said end.

7. The apparatus as in claim 5 further comprising an opening in a top portion of said baseplate; said opening receiving a stop for selectively engaging said pivot pin to secure said cleat in the engaging position.

8. A grip for gripping a wire, comprising:
   a) a baseplate;
   b) a shelf with an upper surface attached to said baseplate;
   c) an eccentric cleat pivotally attached to said baseplate above said shelf upper surface by a pivot pin and including a cleat lower surface having a plurality of teeth formed thereon, said cleat increasing in length from a front edge toward a rear edge thereof and being pivotable from an open position to an engaging position such that the size of a gap between said shelf upper surface and said cleat lower surface decreases as said cleat pivots from said open position to said engaging position, said teeth of said cleat lower surface for engaging a wire positionable between said cleat and said shelf when said cleat is pivoted to said engaging position;
   d) an arcuate guide slot through said baseplate radially spaced from said pivot pin; and
   e) a guide pin secured to said cleat and extending through said guide slot.

* * * * *